US00RE42171E

(19) United States
(12) Reissued Patent
Cha et al.

(10) Patent Number: US RE42,171 E
(45) Date of Reissued Patent: Feb. 22, 2011

(54) DIGITAL DATA FILE ENCRYPTION APPARATUS AND METHOD AND RECORDING MEDIUM FOR RECORDING DIGITAL DATA FILE ENCRYPTION PROGRAM THEREON

(75) Inventors: Ghun-Up Cha, Seoul (KR); Myeong-Joon Kang, Pyungtaek (KR); Han Jung, Seoul (KR)

(73) Assignee: LG Electronics Inc., Seoul (KR)

(21) Appl. No.: 12/252,300

(22) Filed: Oct. 15, 2008

Related U.S. Patent Documents

Reissue of:
(64) Patent No.: 7,130,426
Issued: Oct. 31, 2006
Appl. No.: 09/527,670
Filed: Mar. 17, 2000

(30) Foreign Application Priority Data

Mar. 17, 1999 (KR) ..... 1999/9014

(51) Int. Cl.
*G06F 21/00* (2006.01)
*G06F 12/16* (2006.01)
*H04L 9/00* (2006.01)

(52) U.S. Cl. ..... 726/26; 726/27; 705/50; 705/51; 713/189; 713/193; 380/200; 380/201; 380/237

(58) Field of Classification Search ..... 713/193; 380/201, 237; 726/26; 705/51, 57–59
See application file for complete search history.

(56) References Cited

U.S. PATENT DOCUMENTS 4,907,275 A * 3/1990 Hashimoto ..... 713/161
5,323,464 A 6/1994 Elander et al.
5,539,827 A 7/1996 Liu
5,659,618 A 8/1997 Takahashi et al.
5,867,579 A 2/1999 Saito et al.
5,889,860 A 3/1999 Eller et al.
5,917,915 A 6/1999 Hirose et al.
5,991,399 A 11/1999 Graunke et al.
5,999,622 A 12/1999 Yasukawa et al.

(Continued)

FOREIGN PATENT DOCUMENTS

CN 1205479 A 1/1999

(Continued)

OTHER PUBLICATIONS

Lacy et al., "Music on the Internet and the Intellectual Property Protection Problem", 1997, pp. SS77–SS83, IEEE Catalog No. 97TH8280, ISIE'97 —Guimaraes, Portugal.
Business Wire, "J–Bird Records Becomes First Label to Launch a C0–Branded Download Station with AT&T's a 2b music; Site Allows sampling and Purchase of CD–quality Downloads", Business Wire, New York: Jan. 19, 1999.

*Primary Examiner*—Minh Dieu Nguyen
(74) *Attorney, Agent, or Firm*—Birch, Stewart, Kolasch & Birch, LLC

(57) ABSTRACT

A digital data file encryption system and method where digital data encrypted to a high level and an encryption key are received and stored in a computer. The stored, encrypted digital data is decrypted on the basis of the encryption key and stored in a buffer of a predetermined size. Output digital data from the buffer is reencrypted to a low level of encryption and downloaded to a digital data playing device or a data storage medium. Therefore, a digital audio or video data file is prevented from being diverted in unencrypted form from a computer communication network when it is transmitted to a personal computer through the computer communication network and, in turn, downloaded to the digital data playing device. Further, the digital data playing device is prevented from rising in cost due to the use of simple encryption for data downloaded to the playing device.

8 Claims, 6 Drawing Sheets

U.S. PATENT DOCUMENTS

| | | | |
|---|---|---|---|
| 6,003,135 | A | 12/1999 | Bialick et al. |
| 6,021,199 | A | 2/2000 | Ishibashi et al. |
| 6,170,060 | B1 | 1/2001 | Mott et al. |
| 6,289,454 | B1 | 9/2001 | Eslinger et al. |
| 6,330,675 | B1 | 12/2001 | Wiser et al. |
| 6,367,019 | B1 | 4/2002 | Ansell et al. |
| 6,385,596 | B1 | 5/2002 | Wiser et al. |
| 6,389,534 | B1 | 5/2002 | Elgamal et al. |
| 6,577,735 | B1 | 6/2003 | Bharat |
| 6,751,321 | B1 | 6/2004 | Kato et al. |
| 6,950,941 | B1 | 9/2005 | Lee et al. |
| 2001/0016836 | A1 | 8/2001 | Boccon-Gibod et al. |
| 2001/0042043 | A1 | 11/2001 | Shear et al. |
| 2002/0077984 | A1 | 6/2002 | Ireton |
| 2005/0021477 | A1 | 1/2005 | Krishnan et al. |

FOREIGN PATENT DOCUMENTS

| | | | |
|---|---|---|---|
| JP | 01-246979 | A | 10/1989 |
| JP | 04-302595 | A | 10/1992 |
| JP | 6-189262 | A | 7/1994 |
| JP | 06-326882 | A | 11/1994 |
| JP | 07-295892 | A | 11/1995 |
| JP | 07-297951 | A | 11/1995 |
| JP | 08-006879 | A | 1/1996 |
| JP | 08-055164 | A | 2/1996 |
| JP | 08-069419 | A | 3/1996 |
| JP | 08-077706 | A | 3/1996 |
| JP | 08-107412 | A | 4/1996 |
| JP | 08-125651 | A | 5/1996 |
| JP | 08-130516 | A | 5/1996 |
| JP | 10-13808 | A | 1/1998 |
| JP | 10-013784 | A | 1/1998 |
| JP | 10-178421 | A | 6/1998 |
| KR | 1998-081704 | A | 11/1998 |
| KR | 10-0202390 | B1 | 3/1999 |
| KR | 1999-0038305 | A | 6/1999 |
| WO | WO-00/27067 | A1 | 5/2000 |

* cited by examiner

DIGITAL DATA FILE ENCRYPTION APPARATUS AND METHOD AND RECORDING MEDIUM FOR RECORDING DIGITAL DATA FILE ENCRYPTION PROGRAM THEREON

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue application of application Ser. No. 09/527,670 filed on Mar. 17, 2000 (now U.S. Pat. No. 7,130,246). The present application also claims priority to Korean Patent Application No. 1999/9014 filed in the Republic of Korea on Mar. 17, 1999, which is incorporated by reference it its entirety. There are multiple reissue applications related to U.S. Pat. No. 7,130,246 including Ser. No. 12/252,295 filed Oct. 15, 2008; Ser. No. 12/252,300 filed Oct. 15, 2008 (the present application); Ser. No. 12/252,306 filed Oct. 15, 2008; and Ser. No. 12/252,311 filed Oct. 15, 2008.*

BACKGROUND OF THE INVENTION

1. Field of the Invention

The present invention relates to digital data file encryption in which an encrypted digital data file is prevented from illicit interception and decoding when digital audio data or digital video data is transmitted to a personal computer through a computer communication network and, in turn, downloaded to a digital data player such as an MP3 player.

2. Description of the Related Art

MP3 (shorthand for MPEG-1 Layer 3 Audio) is one of various available digital data formats for audio data. An MP3 player is a new notional, portable digital device capable of readily downloading and reproducing desired data from a computer communication network using an audio data compression coding technique prescribed in MPEG-1 Layer 3. The MP3 player has few faults and excellent sound quality because it stores a file in the form of digital data. Further, the MP3 player is small in size and light in weight, thereby assuring high portability such that a user can carry it even during his physical exercise. For these reasons, this product is a viable alternative to a portable cassette tape recorder and compact disk (CD) player.

With reference to FIG. 1, there is shown in block form a conventional arrangement of a digital data player and associated peripheral devices. In this drawing, the reference numeral 10 denotes a digital data server which assigns an identification (ID) number and password (PWD) to a personal computer 20 for user registration, and which also transmits a digital data player 22 in software form to the personal computer 20. Upon receiving a file supply request from the user, the digital data server 10 identifies the user on the basis of an ID number and password entered by him and supplies an encrypted digital data file to the user in accordance with this identification. The personal computer 20 stores the digital data file supplied from the digital data server 10 on a hard disk 21 therein and decrypts it through the downloaded software player 22 to reproduce the resultant unencrypted digital data file or to download it to a digital data playing device 30. The digital data playing device 30 downloads the unencrypted data file from the personal computer 20 and stores it in a memory unit 40 for the reproduction thereof. The memory unit 40 downloads the unencrypted digital data file from the digital data playing device 30 and stores it in its internal memory 42 to output the file for a desired playing operation.

The operation of the conventional arrangement with the above-mentioned construction will now be described.

In order to legally receive a desired digital data file from the digital data server 10, the user has to register with a digital data file supplier. During user registration, the user is assigned an ID number and password from the digital data file supplier. Then, the user downloads a digital data player 22 in software form from the digital data server 10 through a communication network and installs the downloaded digital data player 22 in the personal computer 20.

Thereafter, to download a desired digital data file from the digital data server 10 through the personal computer 20 and communication network, the user transmits his ID number and password to the digital data server 10 through the personal computer 20 and communication network. The digital data server 10 identifies the user on the basis of the transmitted ID number and password and supplies the desired digital data file to the user in accordance with the identification. At this time, the digital data server 10 encrypts the digital data file using the user's ID number as an encryption key and transmits the encrypted digital data file to the personal computer 20.

The personal computer 20 stores the digital data file transmitted from the digital data server 10 on the hard disk 21. Then, upon receiving a reproduction request from the user, the personal computer 20 decrypts and reproduces the stored digital data file via the digital data software player 22. As a result, the user is able to listen to desired music through the personal computer 20.

On the other hand, if the user intends to listen to music in a digital data file form using the portable digital data playing device 30, then the personal computer 20 decrypts the digital data file, stored on the hard disk 21 with the digital data software player 22, and sends the decrypted digital data file to the digital data playing device 30 through a download unit 23 therein and the communication network.

Then, the digital data playing device 30 stores the digital data file, sent along the above path, in the memory 42 of the memory unit 40, which is typically in the form of a removable card. If the user requests the digital data player 30 to reproduce the digital data file stored in the memory 42, then the digital data player 30 reads the stored digital data file from the memory 42 and reproduces it through a decoder 32 therein. As a result, the user can listen to desired music anywhere using the digital data player 30.

However, the above-mentioned conventional arrangement has a disadvantage in that the digital data file may be intercepted from the communication network during downloading from the personal computer to the digital data playing device (or from the digital data playing device to the memory card) in an unencrypted condition. Such an interception of the unencrypted digital data file makes it impossible to protect the copyright of a music copyright holder and music copyright associates (for example, a music producer and planner taking charge of music production, duplication and distribution). In order to solve the above problem, a conventional powerful encryption method may be used to powerfully encrypt the digital data file and send it to the digital data player. However, such powerful encryption, in turn, requires a powerful decryption function, thereby increasing the cost of the digital data player.

SUMMARY OF THE INVENTION

Therefore, the present invention has been made in view of the above problems, and it is an object of the present invention to provide an encryption system in which illegal outflow of a digital data file, such as MP3, downloaded from a server can be prevented, with no additional increase in cost.

In accordance with one aspect of the present invention, there is provided a method for encrypting digital data including decrypting digital data which has been encrypted at a high encryption level, storing a predetermined amount of the decrypted digital data in a buffer, reencrypting output digital data from the buffer at a low encryption level; and transferring the reencrypted digital data to a digital data player or a data storage medium.

In accordance with another aspect of the present invention, there is provided a method for encrypting digital data including determining whether digital data which has been encrypted at a high encryption level must be protected from unauthorized copying, decrypting the digital data, transferring the decrypted digital data to a digital data player or a data storage medium if the decrypted digital data need not be protected from unauthorized copying, and reencrypting the decrypted digital data at a low encryption level if the decrypted digital data must be protected from unauthorized copying.

In accordance with a further aspect of the present invention, there is provided a program (or script) embodied on a computer-readable medium for encrypting or decrypting a digital data file, the computer-readable-medium-embodied program including a first program code segment to receive and store digital data encrypted to a high level and an encryption key, a second program code segment to decrypt the stored digital data using the encryption key, a third program code segment to store a predetermined amount of the decrypted digital data in a buffer, and a fourth program code segment to reencrypt the digital data from the buffer to a low level and download the reencrypted digital data to a digital data player or a data storage medium.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
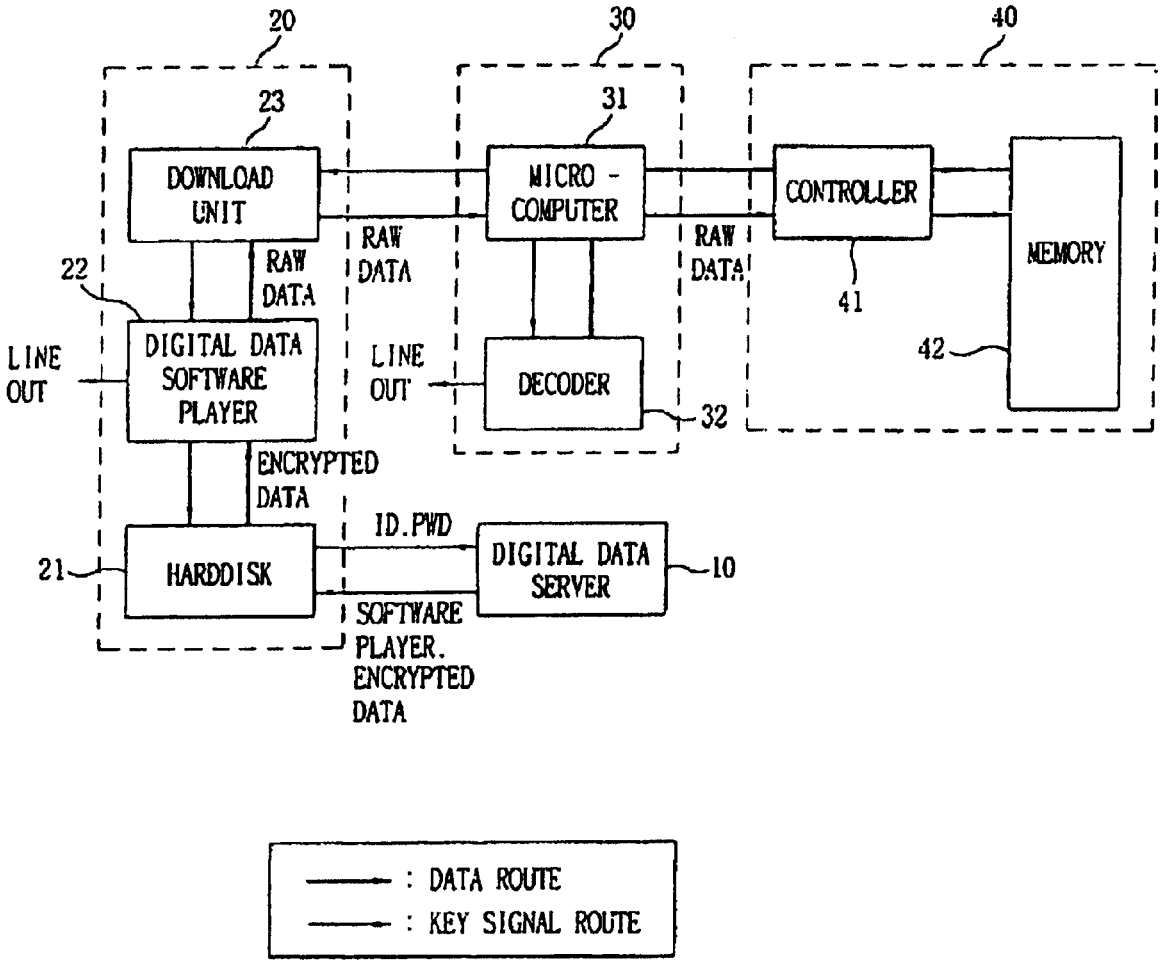
FIG. 1 BACKGROUND ART
FIG. 1 is a block diagram of a conventional arrangement of a digital data player and the associated peripheral devices
Figure 2:
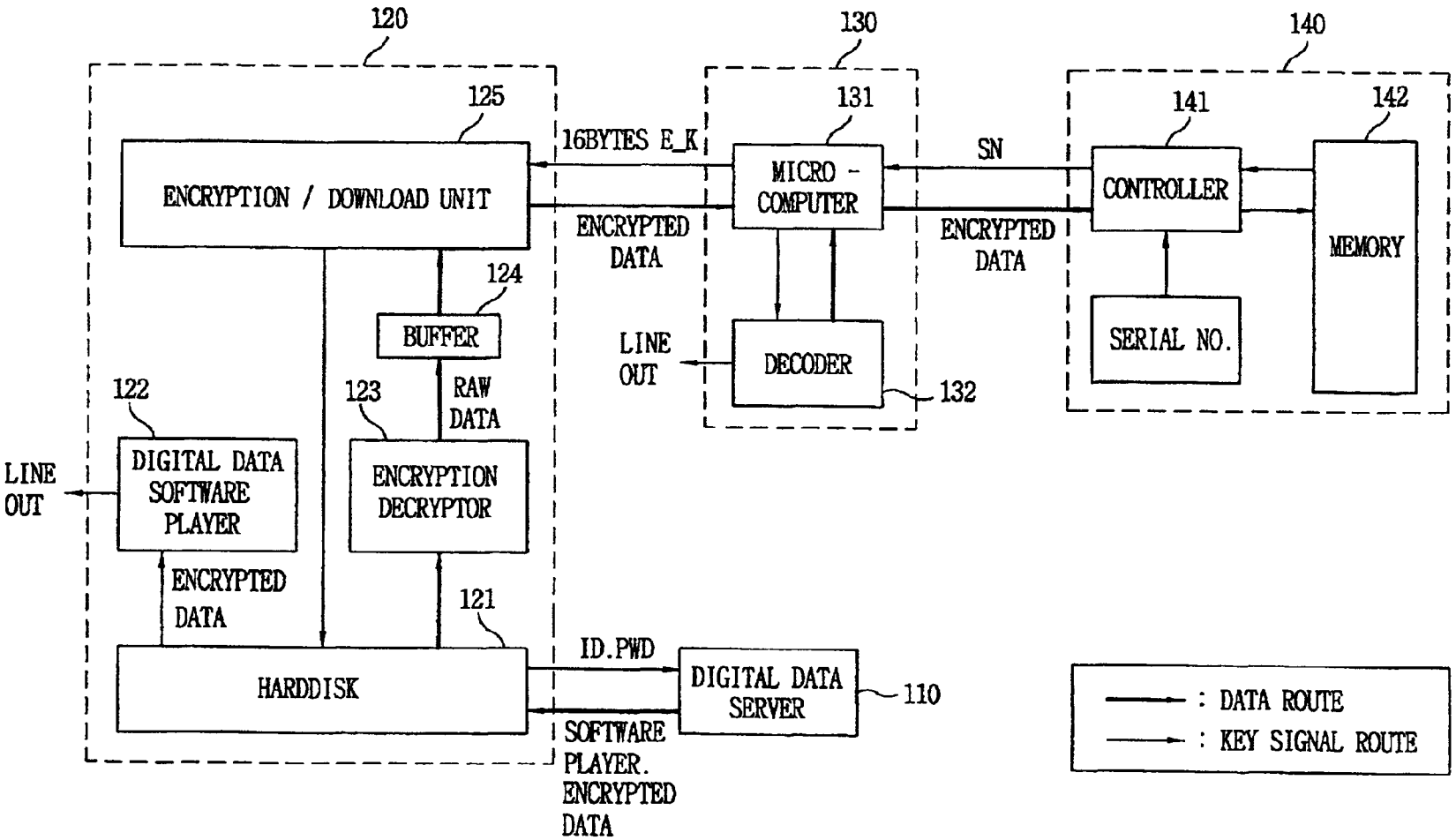
FIG. 2 is a block diagram of an embodiment of a digital data file encryption apparatus in accordance with the present invention.
Figure 6:
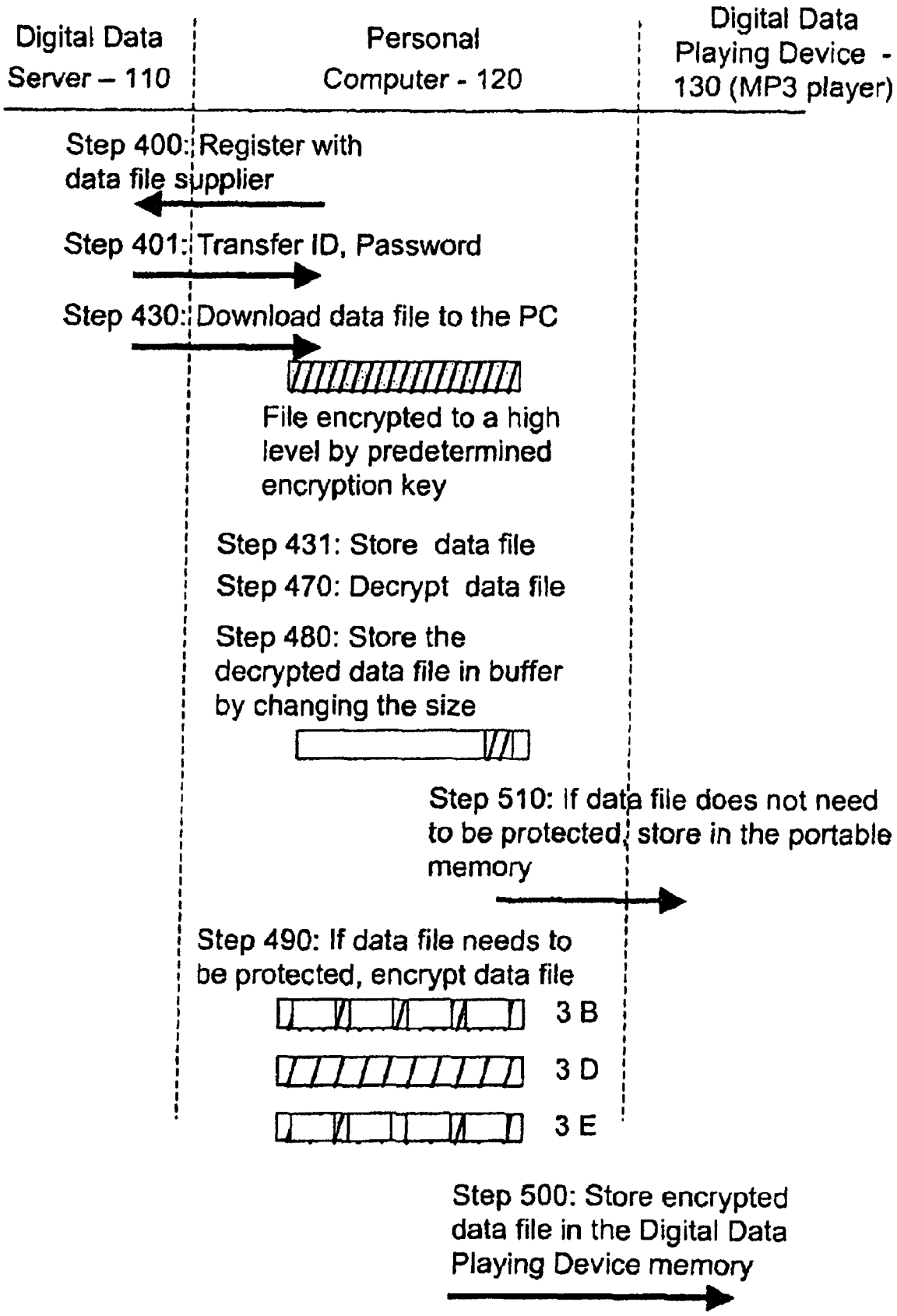
FIG. 6 is a diagram illustrating the digital data file encryption method shown in FIG. 4, and the flow of the data file among the components of the digital data file encryption apparatus shown in FIGS. 2 and 5.

With reference to FIG. 2, there is shown in block form an embodiment of a digital data file encryption system in accordance with the present invention. FIG. 6 illustrates the flow of the data file among the components of the digital data file encryption system. The operation of the digital data file encryption system according to the present invention will hereinafter be described in detail with reference to FIGS. 2 to 4 and 6.

First, the user must register with a digital data file supplier to legally receive a desired digital data file from a digital data server 110 (FIG. 6, Step 400). During user registration, the user is assigned an ID number and password from the digital data file supplier (FIG. 6, Step 401). Then, the user downloads a digital data player 122 in a software form from the digital data server 110 through a communication network and sets the downloaded digital data player 122 in a personal computer 120.

Figure 4:
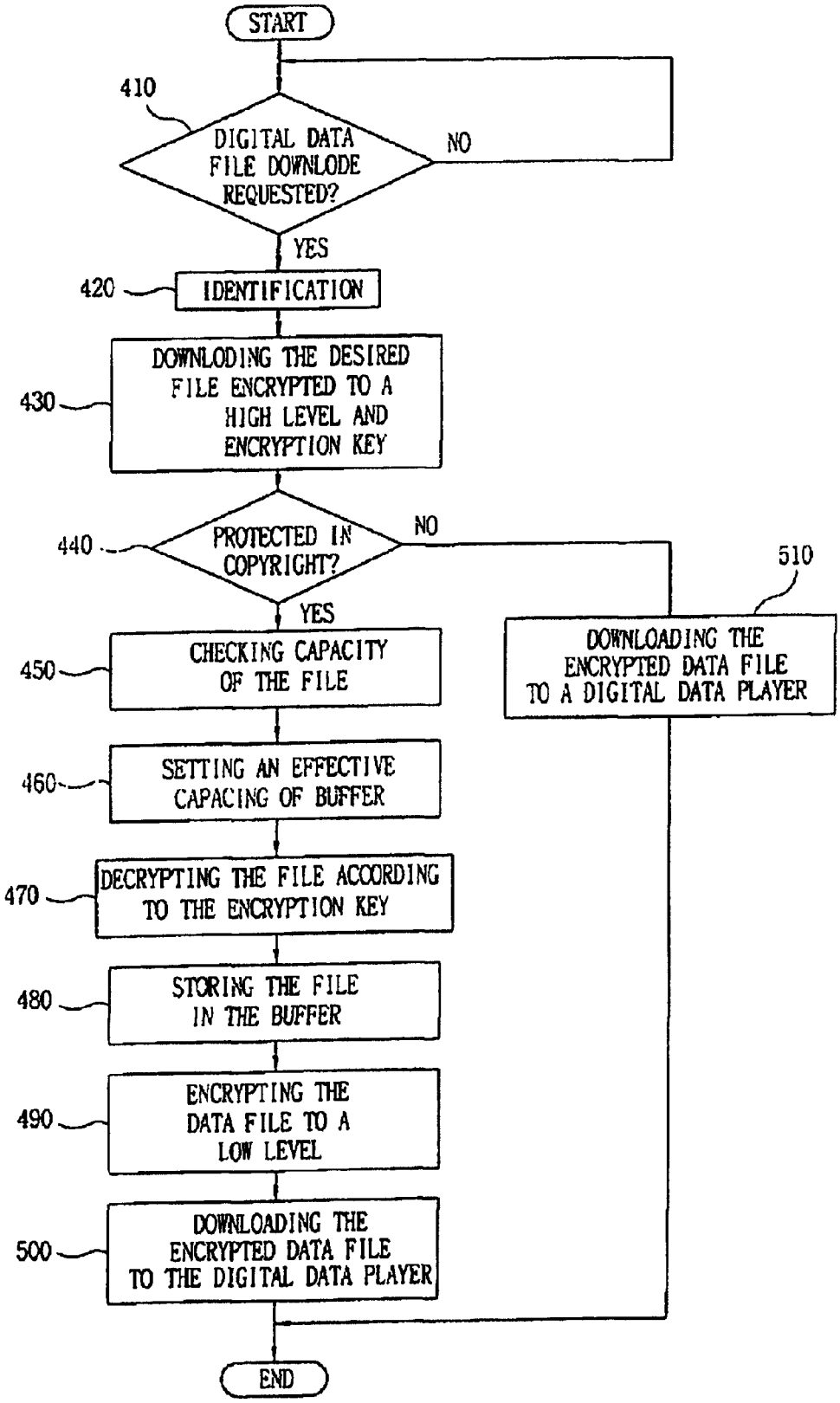
FIG. 4 is a flowchart illustrating a digital data file encryption method in accordance with the present invention.

Thereafter, the user transmits his ID number and password to the digital data server 110 through the personal computer 120 and communication network to download a desired digital data file from the digital data server 110 through the communication network. The digital data server 110 identifies the user on the basis of the transmitted ID number and password and supplies the desired digital data file to the user in accordance with the identification (FIGS. 4 and 6, Step 430). At this time, the digital data server 110 encrypts the digital data file on the basis of a predetermined encryption key and transmits the encrypted digital data file to the personal computer 120.

The personal computer 120 stores the digital data file transmitted from the digital data server 110 on a hard disk 121 therein (FIG. 6, Step 431). Then, upon receiving a reproduction request from the user, the personal computer 120 decrypts and reproduces the stored digital data file through the digital data software player 122. As a result, the user can listen to desired music through the personal computer 120.

On the other hand, in the case where the user intends to listen to music in a digital data file form using a digital data playing device 130, the personal computer 120 has to transmit the desired digital data file to the digital data playing device 130. In this case, if the digital data file is powerfully encrypted and downloaded to the digital data playing device 130, a corresponding powerful decryption function must be performed in the digital data playing device 130. Such powerful decryption would result in an increase in cost of the digital data playing device 130. Alternatively, when the digital data is downloaded under the decrypted, or non-processed, condition, it is subject to illicit diversion during transmission, and subsequent uncontrolled distribution. In order to overcome the above problems, the present encryption apparatus encrypts and downloads the digital data file in the following manner.

In the personal computer 120, an encrypted data file from the hard disk 121 is decrypted by an encryption decryptor 123, temporarily stored in a buffer 124, and then transferred to an encryption/download unit 125 (FIGS. 4 and 6, Steps: 470 and 480). Noticeably, different types of data files may be transferred to the encryption/download unit 125 along the same path. At this time, it is determined whether a given data file must be protected during transmission because of a copyright. If the given data file is determined to be copyrighted, then the buffer 124 is appropriately changed in size according to the size (capacity) of the given file (FIGS. 4 and 6, Steps: 490 and 500). To the contrary, in the case where the given data file need not be protected because of a copyright, then it is directly downloaded to the digital data playing device 130 (FIGS. 4 and 6, Step: 510).

Changing the size of the buffer 124 appropriately as needed causes the decrypted data not to be normally used even if it is hacked or illicitly diverted while being stored in the buffer 124. As a result, the hacking or illicit diversion of the data file so protected does not frustrate the purposes of copyright laws, because the diverted file cannot be used For example, assume that a digital data file to be protected in copyright has a three-minute capacity and it is normally reproducible only when being stored in the buffer 124 in the unit of two-second amounts. In this case, the one-second amount-unit storage of the digital data file in the buffer 124 causes the digital data file not to be normally used even when it illegally flows. As a result, the copyright of the digital data file can be protected. There may be various methods for identifying files to be protected in copyright. One such method is to identify files to be protected in copyright on the basis of extension indexes.

In the case where the output digital data from the buffer 124 need not be protected in copyright, it is downloaded directly in unencrypted form to the digital data playing device 130 through the encryption/download unit 125 (FIGS. 4 and 6, Step: 510). However, if the copyright of the output digital data from the buffer 124 must be protected, then the file is weakly encrypted and downloaded to the digital data playing device 130 by the encryption/download unit 125.

Figure 3A:
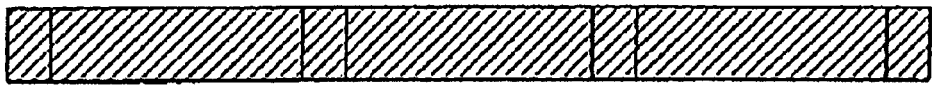
FIGS. 3A to 3E are views illustrating examples of file encryption in accordance with the present invention.
Figure 3B:
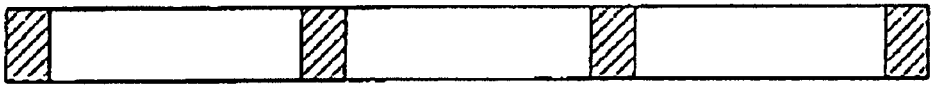

FIGS. 3A to 3E are views illustrating examples of file encryption in accordance with the present invention. For weak encryption, a strongly encrypted file as shown in FIG. 3A is partially decrypted on the basis of a predetermined encryption key and the remaining parts thereof are left strongly encrypted. As a result, a file encrypted and downloaded by the encryption/download unit 125 has striped, strongly encrypted areas as shown in FIG. 3B. Here shading denotes encrypted data and no shading denotes unencrypted data.

Figure 3C:
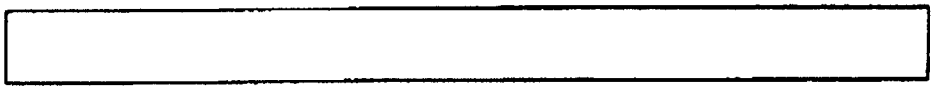
Figure 3D:
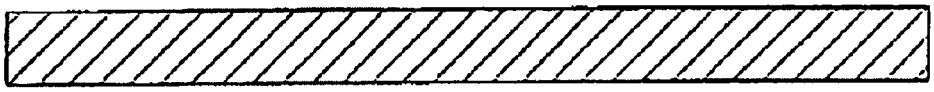
Figure 3E:
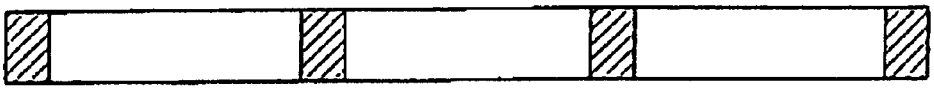

Alternatively, the file encrypted as shown in FIG. 3A may be totally decrypted as shown in FIG. 3C and then more weakly encrypted/downloaded as shown in FIG. 3D on the basis of the predetermined encryption key. Alternatively, the unencrypted file shown in FIG. 3C may have only portions weakly encrypted as shown in FIG. 3E. Any of the encryption schemes shown in FIG. 3B, 3D, or 3E reduce processing requirements for the digital data playing device 130 relative to a file where all of the data has been strongly encrypted. FIG. 6 also the encryption schemes of FIGS. 3B, 3D, and 3E.

The digital data playing device 130 stores the digital data file from the personal computer 120, encrypted and downloaded in the above manner, in a memory 142 of a data storage medium 140 which may be in the form of a removable card. If the user requests the digital data playing device 130 to reproduce the digital data file stored in the memory 142, then the digital data playing device 130 reads the stored digital data file from the memory 142 and reproduces it through a decoder 132 therein. At this time, the digital data file read from the data storage medium 140 has to be decrypted for the reproduction because it is in an encrypted form. For this reason, in the digital data playing device 130, a microcomputer 131 decrypts the digital data file read from the data storage medium 140 on the basis of the encryption key used in the above encryption procedure and outputs the decrypted digital data file to an output line through the decoder 132. Because of the weak encryption shown, for example, in FIGS. 3B, 3D, and 3E, the decoder is kept low-cost. As a result, the user can listen to desired music anywhere using the digital data playing device 130 and the digital data file can be prevented from illicit diversion and distribution while being downloaded to the digital data playing device 130.

In accordance with the present invention, the above encryption method may be implemented by one program on a recording medium. The encryption program is configured to receive and store both digital data encrypted to a high level and an encryption key, decrypt the encrypted digital data according to the encryption key, store the decrypted digital data in a buffer in a predetermined unit of size, reencrypt output digital data from the buffer to a low level and download the reencrypted digital data to a digital data player or a data storage medium. This encryption program is stored on a single recording medium for use in the digital data encryption of the present invention.

FIG. 4 is a flowchart illustrating a digital data file encryption method in accordance with the present invention. A user of the present invention must have previously registered and have been assigned an ID number and password, as described earlier in the description of the related art.

Thereafter, acccording to the present invention as shown in FIG. 4, upon receiving a digital data file download request from a personal computer at Step 410, a server identifies the user at Step 420 to determine whether the user is legitimate. At this time, the server identifies the user on the basis of an ID code and password which are assigned from the server to the user, as stated previously. If the user is identified to be legitimate, the server downloads a desired digital data file encrypted to a high level and an encryption key to the personal computer at Step 430. Upon downloading the desired digital data file from the server, the personal computer determines at Step 440 whether a copyright of the downloaded file must be protected. If the downloaded digital data file need not be protected in copyright, then it is decrypted and downloaded directly to a digital data player at Step 510. In this case, because no copyright problem is caused even when the downloaded file is hacked/diverted, there is no necessity for encrypting the downloaded file to send it to the digital data player.

On the other hand, in the case where it is determined at the above Step 440 that the copyright of the downloaded file must be protected, the personal computer first checks the capacity of the downloaded file at Step 450 and then sets an effective capacity of a buffer in accordance with the checked result ate Step 460. Then, the personal computer decrypts the downloaded file according to the encryption key at Step 470 and stores the decrypted file in the buffer at Step 480 in such a manner that the decrypted file cannot be normally reproduced even when it is hacked in process of being downloaded to the digital data player. The digital data file stored in the buffer is encrypted to a low level at Step 490. This low level encryption does not require a separate microprocessor which is typically used for the high level encryption or powerful encryption, thereby avoiding an increase in cost of the associated playing device. Then, the digital data file encrypted to the low level is downloaded to the digital data playing device at Step 500.

Figure 5:
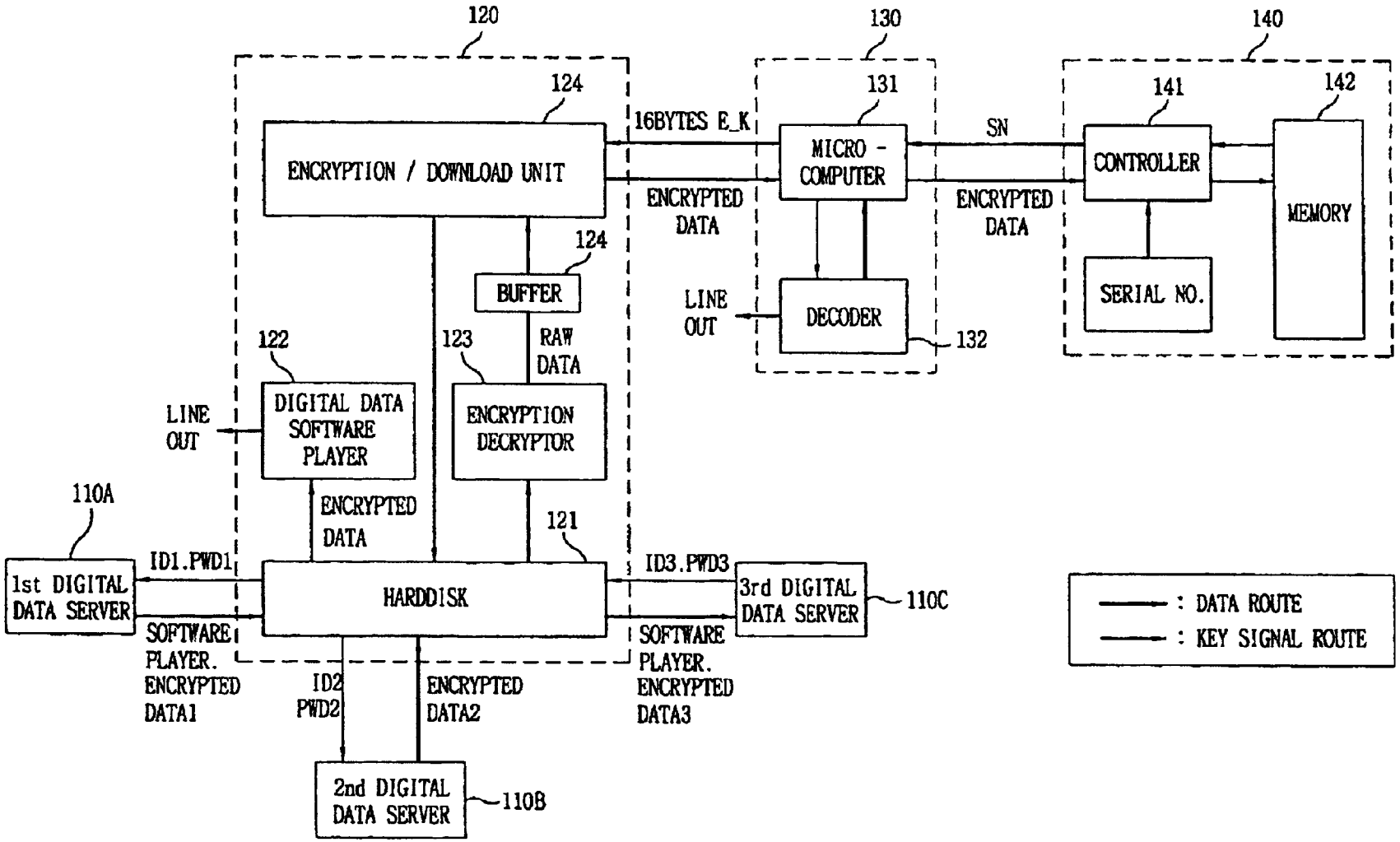
FIG. 5 is a block diagram of an alternative embodiment of the digital data file encryption apparatus in accordance with the present invention.

With reference to FIG. 5, there is shown in block form an alternative embodiment of the digital data file encryption system in accordance with the present invention. This second embodiment is substantially the same in construction as the first embodiment, with the exception that a plurality of digital data servers 110A–110C are provided. Because of the provision of the plurality of digital data servers, the personal computer 120 performs the decryption operation, not using the single encryption key as shown in FIG. 2, but using a plurality of encryption keys supplied respectively from the digital data servers. Then, the personal computer 120 reproduces the decrypted, or non-processed, digital data files or downloads them (with or without encryption) to the digital data playing device 130 for storing in the storage medium 140 in the same manner as stated previously.

FIG. 6 is a diagram illustrating the digital data file encryption method shown in FIG. 4, and the flow of the data file among the components of the digital data file encryption apparatus shown in FIGS. 2 and 5. After the user registers with a data file supplier (Step 400), and is assigned an ID number and password (Step 401), the user is authorized by the digital data server to receive data files upon request. The request by the user is fulfilled by the digital data server downloading the data file (Step 430), the file having been encrypted to a high level by the predetermined encryption key. The data file is received and stored in the personal computer (Step 431), partially decrypted (Step 470) and then stored by changing the size of the buffer (Step 480).

If the downloaded digital data file need not be protected in copyright, then it is decrypted and downloaded directly to a digital data player at Step 510. In this case, because no copyright problem is caused even when the downloaded file is hacked/diverted, there is no necessity for encrypting the downloaded file to send it to the digital data player. On the other hand, in the case where it is determined at the above step 440 that the copyright of the downloaded file must be protected, the digital data file stored in the buffer is encrypted to a low level at step 490. As described above with reference to FIGS. 3B, 3D, and 3E, any of the encryption schemes 3B, 3D, and 3E may be used. This low level encryption does not require a separate microprocessor which is typically used for the high level encryption or powerful encryption, thereby avoiding an increase in cost of the associated playing device. Then, the digital data file encrypted to the low level is downloaded to the digital data playing device at step 500.

According to the present invention, a digital data file downloaded from a single server is decrypted, stored in the buffer in a predetermined unit of size, encrypted in a somewhat simple manner and downloaded to the digital data player. Digital data files downloaded from a plurality of servers are decrypted in individual decryption manners, encrypted in the simple manner as mentioned above and downloaded to the digital data player. Therefore, it is possible to reliably protect the copyright of a given digital data file without increasing the cost of the digital data player due to the decryption function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

[1. A method for copy protection, comprising:

generating a partially decrypted data unit, the partially decrypted data unit including two portions, one of the two portions is encrypted having a protection level different from the other of the two portions; and transferring the partially decrypted data unit to a target device for further decrypting based on information used in the step of generating the partially decrypted data unit; and further comprising the steps of:

registering a computer with a data server;

transferring encrypted data from the data server to the computer the computer generating the partially decrypted data unit in a first decryption unit of the computer; and using a second decryption unit of the target device to further decrypt the partially decrypted data unit based on the information used in the step of generating the partially decrypted data unit.]

[2. The method of claim 1, wherein the two portions having the different protection levels are spaced apart at a predetermined interval on the data unit.]

[3. The method of claim 2, further comprising the step of storing the partially decrypted data unit in a data storage medium or a digital data player.]

[4. The method of claim 3, further comprising the step of reading the partially decrypted stored data unit from the data storage medium or the digital data player and reproducing the data unit at the request of a user.]

[5. The method of claim 4, further comprising the step of decrypting the data unit based on a predetermined encryption key, and outputting the decrypted data unit to an output line.]

[6. The method of claim 2, further comprising the step of decrypting a remainder of the partially decrypted data unit in the target device.]

[7. The method of claim 1, wherein the data unit is partially decrypted based on a predetermined encryption key.]

[8. The method of claim 2, wherein the predetermined interval is a multiple or divisor of a buffer size.]

[9. The method of claim 1, wherein the step of partially decrypting the encrypted data unit in the computer is performed at a plurality of locations spaced apart at a predetermined interval on the partially decrypted data unit.]

[10. The method of claim 1, further comprising the step of storing the partially decrypted data unit in a data storage medium or a digital data player.]

[11. The method of claim 10, further comprising the step of reading the partially decrypted stored data unit from the data storage medium and reproducing the partially decrypted data unit upon request of a user.]

[12. The method of claim 11, further comprising the steps of:

sending the partially decrypted digital data unit to the digital data player;

decrypting the reencrypted data unit based on a predetermined encryption key; and outputting the decrypted data unit to an output line of the digital data player.]

[13. The method of claim 1, wherein the data unit received by the target device is partially decrypted based on a predetermined encryption key.]

[14. The method of claim 13, further comprising the steps of:

partially decrypting the encrypted data unit in the computer is performed independently of operating the second decryption unit in the target device.]

[15. A method for copy protection, comprising:

receiving a data unit that has been encrypted based on a predetermined encryption key;

identifying whether or not the received data unit needs to be protected;

generating an encrypted data unit having a different encryption level or method from one used to encrypt the data unit, based on a result of the identifying step; and transferring the generated encrypted data unit having the different encryption level or method to a target device for decrypting based on information used in the step of generating the encrypted data unit; and further comprising the steps of:

registering a computer with a data server;

transferring the data unit from the data server to the computer;

using a first decryption unit of the computer for generating the encrypted data unit having the different encryption level or method; and using a second decryption unit of the target device for decrypting the generated encrypted data unit having the different encryption level or method based on the information used in the step of generating the generated encrypted data unit.]

[16. The method of claim 15, wherein the generated encrypted data unit includes two portions having the different protection levels spaced apart at a predetermined interval on the data unit.]

[17. The method of claim 16, further comprising the step of storing the generated encrypted data unit in a data storage medium or a digital data player.]

[18. The method of claim 17, further comprising the step of reading the generated encrypted data unit from the data storage medium or the digital data player and reproducing the data unit at the request of a user.]

[19. The method of claim 18, further comprising the step of decrypting the data unit based on a predetermined encryption key, and outputting the decrypted data unit to an output line.]

[20. The method of claim 16, further comprising the step of decrypting the generated encrypted data unit in the target device.]

[21. The method of claim 16, wherein the step of generating the encrypted data unit is based on a predetermined encryption key.]

[22. The method of claim 16, wherein the predetermined interval is a multiple or divisor of a buffer size.]

[23. A method for copy protection, comprising the steps of:

enabling a registration mode for inputting a user identification;

receiving a data unit from a storage device based on the inputted user identification information, wherein the data unit has been encrypted;

generating an encrypted data unit having a different encryption level or method from one used to encrypt the data unit; and transferring the encrypted data unit having the different encryption level or method to a target device for decrypting based on information used in the step of generating the differently encrypted data unit; and further comprising the steps of:

registering a computer with a data server;

transferring the data unit from the data server to the computer;

using a first decryption unit of the computer for generating the encrypted data unit having the different encryption level or method; and using a second decryption unit of the target device for decrypting the generated encrypted data unit having the different encryption level or method based on the information used in the step of generating the generated encrypted data unit.]

[24. The method of claim 23, wherein the step of generating the encrypted data unit is performed at a plurality of locations spaced apart at a predetermined interval on the generated encrypted data unit.]

[25. The method of claim 24, further comprising the step of reading the generated encrypted data unit from the data storage medium and reproducing the generated encrypted data unit upon request of a user.]

[26. The method of claim 25, further comprising the steps of:

sending the generated encrypted data unit to the digital data player;

decrypting the generated encrypted data unit based on a predetermined encryption key; and outputting the decrypted data unit to an output line of the digital data player.]

[27. The method of claim 23, further comprising the step of storing the generated encrypted data unit in a data storage medium or a digital data player.]

[28. The method of claim 23, wherein the data unit received by the target device is encrypted based on a predetermined encryption key.]

[29. The method of claim 23, wherein the step of generating the encrypted data unit is performed independently of decrypting the generated encryption unit in the target device.]

[30. A method for encrypting a digital data file, comprising:

receiving a data file from a digital data server, the data file having been encrypted in the digital data server based on a predetermined encryption key;

decrypting the data file using the predetermined encryption key;

identifying whether or not the received data file needs to be protected;

reencrypting the decrypted data file on the basis of the identified result; and transferring the reencrypted data file to a target device, wherein the reencrypted data file has a different level of encryption as compared to that of the received data file that was encrypted in the digital data server; and further comprising the steps of:

registering a computer with the digital data server;

transferring the data file from the digital data server to the computer;

using a first decryption unit of the computer for generating the reencrypted data file having the different level of encryption; and using a second decryption unit of the target device to decrypt the reencrypted data file having the different level of encryption based on the information used in the step of reencrypting the decrypted data file.]

*31. A method for managing content data, the method being performed by at least one playing device and comprising:*

*receiving content data from an external source device, the content data being encrypted by a first encryption method;*

*controlling a duration time for the content data based on an identifying operation, the content data being available on a buffer of the playing device for the duration time, and the identifying operation determining whether or not the duration time for the content data is controlled based on protection information associated with the content data;*

*determining whether or not to change the first encryption method based on the protection information associated with the content data; and*

*changing the first encryption method into a second encryption method for the content data when the deter-*

*mining step determines the first encryption method is to be changed into the second encryption method,*

*wherein the second encryption method is different from the first encryption method and is selected among a plurality of predetermined encrypting methods such that an external target device can decrypt the content data encrypted by the second encryption method.*

*32. The method of claim 31, wherein a size of the buffer is changed for the controlling the duration time.*

*33. The method of claim 31, wherein the changing step comprises:*

*decrypting the content data being encrypted by the first encryption method; and*

*re-encrypting the decrypted content data by the second encryption method.*

*34. The method of claim 33, further comprising:*

*transmitting the content data being re-encrypted by the second encryption method to the external target device.*

*35. An apparatus for managing content data, the apparatus comprising:*

*a buffer;*

*a controller programmed to:*

*receive content data from an external source device, the content data being encrypted by a first encryption method;*

*control a duration time for the content data based on an identifying operation, the content data being available in the buffer of the playing device for the duration time, and the identifying operation determining whether or not the duration time for the content data is controlled based on protection information associated with the content data;*

*determine whether or not to change the first encryption method based on the protection information associated with the content data; and*

*change the first encryption method into a second encryption method for the content data when the first encryption method is determined to be changed into the second encryption method,*

*wherein the second encryption method is different from the first encryption method and is selected among a plurality of predetermined encrypting method such that an external target device can decrypt the content data encrypted by the second encryption method.*

*36. The apparatus of claim 35, wherein the controller is programmed to change a size of the buffer for controlling the duration time.*

*37. The apparatus of claim 35, further comprising:*

*a decryptor programmed to decrypt the content data being encrypted by the first encryption method; and*

*an encryption unit programmed to re-encrypt the decrypted content data by the second encryption method.*

*38. The apparatus of claim 37, wherein the controller is further programmed to transmit the content data being re-encrypted by the second encryption method to the external target device.*

* * * * *